US008650432B2

(12) United States Patent
Nakata

(10) Patent No.: US 8,650,432 B2
(45) Date of Patent: *Feb. 11, 2014

(54) DISTRIBUTED RESOURCE MANAGING SYSTEM, DISTRIBUTED RESOURCE MANAGING METHOD, AND DISTRIBUTED RESOURCE MANAGING PROGRAM

(75) Inventor: Tsuneo Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 233 days.

This patent is subject to a terminal disclaimer.

(21) Appl. No.: 12/934,040

(22) PCT Filed: Feb. 17, 2009

(86) PCT No.: PCT/JP2009/052631
§ 371 (c)(1),
(2), (4) Date: Sep. 22, 2010

(87) PCT Pub. No.: WO2009/122791
PCT Pub. Date: Oct. 8, 2009

(65) Prior Publication Data
US 2011/0022881 A1      Jan. 27, 2011

(30) Foreign Application Priority Data

Mar. 31, 2008    (JP) .................................. 2008-089325

(51) Int. Cl.
*G06F 11/00*          (2006.01)
(52) U.S. Cl.
USPC ................................... 714/4.1; 714/2; 714/10
(58) Field of Classification Search
USPC ................... 714/2, 4.1, 4.11, 10, 25
See application file for complete search history.

(56) References Cited

U.S. PATENT DOCUMENTS

| 7,289,450 | B2 | 10/2007 | Nakata |
| 7,669,087 | B1* | 2/2010 | Johnsen et al. ............. 714/6.32 |
| 8,032,890 | B2* | 10/2011 | Brendle et al. ................ 718/104 |

(Continued)

FOREIGN PATENT DOCUMENTS

| CN | 1524361 A | 8/2004 |
| JP | 2003060689 A | 2/2000 |

(Continued)

OTHER PUBLICATIONS

Japanese Office Action for JP2008-089325 mailed on Jul. 17, 2012.

(Continued)

*Primary Examiner* — Sarai Butler
(74) *Attorney, Agent, or Firm* — Sughrue Mion, PLLC

(57) ABSTRACT

A distributed resource managing system has one or more resource managing processes corresponding to each of predefined events that change the states of resources, on a communication network where each of a plurality of tasks can use a plurality of resources. Each of the one or more resource managing processes includes an assignor which, when it receives a request to protect any specific task against the event that changes states of resources to which its own process corresponds, assigns backup resources including a resource already selected by another resource managing process to the task in such a way that all tasks requested to be protected which use the resource can be protected from the event that changes the states of the resources, and an indicator which indicates information of the assigned backup resources to one or more recovery execution processes.

10 Claims, 19 Drawing Sheets

(56) References Cited

U.S. PATENT DOCUMENTS

| | | | | |
|---|---|---|---|---|
| 2001/0037473 | A1* | 11/2001 | Matsuura et al. | 714/5 |
| 2006/0117212 | A1* | 6/2006 | Meyer et al. | 714/4 |
| 2006/0294421 | A1* | 12/2006 | Schneider | 714/15 |
| 2007/0168244 | A1* | 7/2007 | Dan et al. | 705/8 |
| 2009/0172475 | A1* | 7/2009 | Hampton | 714/38 |

FOREIGN PATENT DOCUMENTS

| | | | |
|---|---|---|---|
| JP | 2004040384 A | 2/2004 | |
| JP | 2005078284 A | 3/2005 | |
| JP | 2005210514 A | 8/2005 | |
| JP | 2006135686 A | 5/2006 | |
| JP | 2006319758 A | 11/2006 | |
| JP | 2007049336 A | 2/2007 | |
| JP | 2007129782 A | 5/2007 | |

OTHER PUBLICATIONS

International Search Report for PCT/JP2009/052631 mailed Apr. 14, 2009.

S. Yuan et al., "Dynamic Lightpath Protection in WDM Mesh Networks under Risk-Disjoint Constraint", in Proceedings of IEEE Globecom 2004, 2004, pp. 1770-1774.

H. Matsuura et al., "Disjointed SRLG Routing for GMPLS Networks by Hierarchically Distributed PCE", IEICE Trans. Commun., vol. E90-B, No. 1, Jan. 2007, pp. 51-61.

E. Bouillet et al., "Distributed Computation of Shared Buckup Path in Mesh Optical Networks Using Probabilistic Methods", IEEE/ACM Transactions on Networking, vol. 12, No. 5, Oct. 2004, pp. 920-930.

Zong-Li Tang et al., "A Mixed Shared and Multi Paths Protection Scheme with SRLG Constraints", in Proceedings of 8th ACIS Int'l Conf. on Software Engineering, Artificial Intelligence, Networking, and Parallel/Distributed Computing, 2007, pp. 60-65.

D. Awduche et al.. "RSVP-TE: Extensions RSVP for LSP Tunnels", Network Working Group, RFC3209, Dec. 21, 2001.

J. K. Choi et al., "Signaling Extension for the End-to-End Restoration with SRLG", CCAMP Working Group, internet draft, draft-choi-ccamp-e2e-restoration-srlg-01.txt, Feb. 2004.

J. Lang, Ed. et al., "Generalized Multi-Protocol Label Switching (GMPLS) Recovety Functional Specification", Network Working Group, RFC4426, Mar. 2006.

D. Papadimitriou, Ed. et al., "Analysis of Generalized Multi-Protocol Label Switching (GMPLS)-based Recovery Mechanisms (including Protection and Restoration)", Network Working Group, RFC4428, Mar. 2006.

D. Katz et al., "Traffic Engineering (TE) Extensions to OSPF Version 2". Network Working Group, RFC3630, Sep. 2003.

Chinese Office Action for CN Application No. 200980111806.5 issued on Oct. 18, 2013 with English Translation.

* cited by examiner

Fig.3

| resource | capacity | active bands in use | all backup bands reserved | backup bands reserved by its own process |
|---|---|---|---|---|
| 300-1 downlink | 10 | 0 | 2 | 0 |
| 300-1 uplink | 10 | 0 | 0 | 0 |
| 300-2 downlink | 10 | 2 | 3 | 3 |
| 300-2 uplink | 10 | 0 | 0 | 0 |
| 300-3 downlink | 10 | 0 | 0 | 0 |
| 300-3 uplink | 10 | 0 | 3 | 3 |
| 300-4 downlink | 20 | 5 | 0 | 0 |
| 300-4 uplink | 20 | 0 | 0 | 0 |
| 300-5 downlink | 10 | 3 | 0 | 0 |
| 300-5 uplink | 5 | 0 | 0 | 0 |
| 300-6 downlink | 10 | 3 | 0 | 0 |
| 300-6 uplink | 10 | 0 | 0 | 0 |
| 300-7 downlink | 10 | 2 | 0 | 0 |
| 300-7 uplink | 10 | 0 | 0 | 0 |
| 300-8 downlink | 10 | 0 | 2 | 0 |
| 300-8 uplink | 10 | 2 | 0 | 0 |
| 300-9 downlink | 10 | 0 | 0 | 0 |
| 300-9 uplink | 10 | 0 | 0 | 0 |
| 300-10 downlink | 10 | 0 | 0 | 0 |
| 300-10 uplink | 10 | 0 | 0 | 0 |

Fig.4

| task ID | source node | destination node | active resources | backup resources | recovery execution process | guaranteed band |
|---|---|---|---|---|---|---|
| 3-1 | 101-3 | 101-6 | 300-4 downlink/300-5 downlink/300-6 downlink | 300-3 uplink/300-2 downlink | 202-6 | 3 |
| 3-2 | 101-3 | 101-8 | 300-4 downlink/300-9 downlink | - | - | 2 |

Fig.5

| resource | capacity | active bands in use | all backup bands reserved | backup bands reserved by its own process |
|---|---|---|---|---|
| 300-1 downlink | 10 | 0 | 2 | 2 |
| 300-1 uplink | 10 | 0 | 0 | 0 |
| 300-2 downlink | 10 | 2 | 3 | 0 |
| 300-2 uplink | 10 | 0 | 0 | 0 |
| 300-3 downlink | 10 | 0 | 3 | 0 |
| 300-3 uplink | 10 | 0 | 0 | 0 |
| 300-4 downlink | 20 | 5 | 0 | 0 |
| 300-4 uplink | 20 | 1 | 0 | 0 |
| 300-5 downlink | 10 | 0 | 0 | 0 |
| 300-5 uplink | 5 | 3 | 0 | 0 |
| 300-6 downlink | 10 | 0 | 0 | 0 |
| 300-6 uplink | 10 | 2 | 0 | 0 |
| 300-7 downlink | 10 | 0 | 0 | 0 |
| 300-7 uplink | 10 | 0 | 2 | 2 |
| 300-8 downlink | 10 | 2 | 0 | 0 |
| 300-8 uplink | 10 | 0 | 0 | 0 |
| 300-9 downlink | 10 | 0 | 0 | 0 |
| 300-9 uplink | 10 | 0 | 0 | 0 |
| 300-10 downlink | 10 | 0 | 0 | 0 |
| 300-10 uplink | 10 | 0 | 0 | 0 |

Fig.6

| task ID | source node | destination node | active resources | backup resources | recovery execution process | guaranteed band |
|---|---|---|---|---|---|---|
| 1-1 | 101-1 | 101-7 | 300-2 downlink/300-7 downlink | 300-1 downlink/300-8 downlink | 202-7 | 2 |

Fig.7

| task ID | source node | destination node | active resources | backup resources | recovery execution process | guaranteed band |
|---|---|---|---|---|---|---|
| 3-1 | 101-3 | 101-6 | 300-4 downlink/300-5 downlink/300-6 downlink | 300-3 uplink/300-2 downlink | 202-6 | 3 |
| 3-2 | 101-3 | 101-8 | 300-4 downlink/300-9 downlink | - | - | 2 |
| 3-3 | 101-3 | 101-7 | 300-4 downlink/300-5 downlink/300-6 downlink/300-7 downlink | 300-3 uplink/300-1 downlink/300-8 downlink | 202-6 | 4 |

Fig.8

| task ID | source node | destination node | active resources | backup resources | recovery execution process | guaranteed band |
|---|---|---|---|---|---|---|
| 1-1 | 101-1 | 101-7 | 300-2 downlink/300-7 downlink | 300-1 downlink/300-8 downlink | 202-7 | 2 |
| 3-3 | 101-3 | 101-7 | 300-4 downlink/300-5 downlink/300-6 downlink/300-7 downlink | 300-9 downlink/300-10 uplink | 202-7 | 4 |

Fig.9

| resource | capacity | active bands in use | all backup bands reserved | backup bands reserved by its own process |
|---|---|---|---|---|
| 300-1 downlink | 10 | 0 | 4 | 4 |
| 300-1 uplink | 10 | 0 | 0 | 0 |
| 300-2 downlink | 10 | 2 | 3 | 3 |
| 300-2 uplink | 10 | 0 | 0 | 0 |
| 300-3 downlink | 10 | 0 | 0 | 0 |
| 300-3 uplink | 10 | 9 | 7 | 7 |
| 300-4 downlink | 20 | 0 | 0 | 0 |
| 300-4 uplink | 20 | 7 | 0 | 0 |
| 300-5 downlink | 10 | 0 | 0 | 0 |
| 300-5 uplink | 5 | 7 | 0 | 0 |
| 300-6 downlink | 10 | 0 | 0 | 0 |
| 300-6 uplink | 10 | 6 | 0 | 0 |
| 300-7 downlink | 10 | 0 | 0 | 0 |
| 300-7 uplink | 10 | 0 | 4 | 4 |
| 300-8 downlink | 10 | 0 | 0 | 0 |
| 300-8 uplink | 10 | 2 | 4 | 4 |
| 300-9 downlink | 10 | 0 | 0 | 0 |
| 300-9 uplink | 10 | 0 | 0 | 0 |
| 300-10 downlink | 10 | 0 | 0 | 0 |
| 300-10 uplink | 10 | 0 | 4 | 0 |

Fig.10

| resource | capacity | active bands in use | all backup bands reserved | backup bands reserved by its own process |
|---|---|---|---|---|
| 300-1 downlink | 10 | 0 | 4 | 2 |
| 300-1 uplink | 10 | 0 | 0 | 0 |
| 300-2 downlink | 10 | 2 | 3 | 0 |
| 300-2 uplink | 10 | 0 | 0 | 0 |
| 300-3 downlink | 10 | 0 | 0 | 0 |
| 300-3 uplink | 10 | 0 | 7 | 0 |
| 300-4 downlink | 20 | 9 | 0 | 0 |
| 300-4 uplink | 20 | 0 | 0 | 0 |
| 300-5 downlink | 10 | 7 | 0 | 0 |
| 300-5 uplink | 5 | 0 | 0 | 0 |
| 300-6 downlink | 10 | 7 | 0 | 0 |
| 300-6 uplink | 10 | 0 | 0 | 0 |
| 300-7 downlink | 10 | 6 | 0 | 0 |
| 300-7 uplink | 10 | 0 | 0 | 0 |
| 300-8 downlink | 10 | 0 | 4 | 2 |
| 300-8 uplink | 10 | 0 | 0 | 0 |
| 300-9 downlink | 10 | 2 | 4 | 4 |
| 300-9 uplink | 10 | 0 | 0 | 0 |
| 300-10 downlink | 10 | 0 | 0 | 0 |
| 300-10 uplink | 10 | 0 | 4 | 4 |

Fig.12

| resource | capacity | active bands in use | all backup bands reserved | backup bands reserved by its own process |
|---|---|---|---|---|
| 300-1 downlink | 10 | 0 | 2 | 0 |
| 300-1 uplink | 10 | 0 | 0 | 0 |
| 300-2 downlink | 10 | 2 | 3 | 3 |
| 300-2 uplink | 10 | 0 | 0 | 0 |
| 300-3 downlink | 10 | 0 | 0 | 0 |
| 300-3 uplink | 10 | 0 | 3 | 3 |
| 300-4 downlink | 20 | 5 | 0 | 0 |
| 300-4 uplink | 20 | 0 | 0 | 0 |
| 300-5 downlink | 10 | 3 | 0 | 0 |
| 300-5 uplink | 5 | 0 | 0 | 0 |
| 300-6 downlink | 10 | 3 | 0 | 0 |
| 300-6 uplink | 10 | 0 | 0 | 0 |
| 300-7 downlink | 10 | 2 | 0 | 0 |
| 300-7 uplink | 10 | 0 | 0 | 0 |
| 300-8 downlink | 10 | 0 | 2 | 0 |
| 300-8 uplink | 10 | 0 | 0 | 0 |
| 300-9 downlink | 10 | 2 | 0 | 0 |
| 300-9 uplink | 10 | 0 | 0 | 0 |
| 300-10 downlink | 10 | 0 | 0 | 0 |
| 300-10 uplink | 10 | 2 | 3 | 3 |
| 400-1 | 20 | 2 | 0 | 0 |
| 400-4 | 5 | 2 | 0 | 0 |
| 400-5 | 10 | 3 | 0 | 0 |

Fig.13

| task ID | source node | destination node | active resources | backup resources | recovery execution process | guaranteed band |
|---|---|---|---|---|---|---|
| 3-1 | 101-3 | 101-6 | 300-4 downlink/300-5 downlink/ 300-6 downlink/400-5 | 300-3 uplink/ 300-2 downlink/400-1 | 202-6 | 3 |
| 3-2 | 101-3 | 101-8 | 300-4 downlink/300-9 downlink/ 400-4 | - | - | 2 |

Fig.14

| resource | capacity | active bands in use | all backup bands reserved | backup bands reserved by its own process |
|---|---|---|---|---|
| 300-1 downlink | 10 | 0 | 2 | 2 |
| 300-1 uplink | 10 | 0 | 0 | 0 |
| 300-2 downlink | 10 | 2 | 3 | 0 |
| 300-2 uplink | 10 | 0 | 0 | 0 |
| 300-3 downlink | 10 | 0 | 3 | 0 |
| 300-3 uplink | 10 | 0 | 0 | 0 |
| 300-4 downlink | 20 | 5 | 0 | 0 |
| 300-4 uplink | 20 | 0 | 0 | 0 |
| 300-5 downlink | 10 | 3 | 0 | 0 |
| 300-5 uplink | 5 | 0 | 0 | 0 |
| 300-6 downlink | 10 | 3 | 0 | 0 |
| 300-6 uplink | 10 | 0 | 0 | 0 |
| 300-7 downlink | 10 | 4 | 0 | 0 |
| 300-7 uplink | 10 | 0 | 0 | 0 |
| 300-8 downlink | 10 | 2 | 2 | 2 |
| 300-8 uplink | 10 | 0 | 0 | 0 |
| 300-9 downlink | 10 | 0 | 0 | 0 |
| 300-9 uplink | 10 | 0 | 0 | 0 |
| 300-10 downlink | 10 | 0 | 0 | 0 |
| 300-10 uplink | 10 | 0 | 0 | 0 |
| 400-1 | 20 | 4 | 3 | 0 |
| 400-4 | 10 | 2 | 0 | 0 |
| 400-5 | 10 | 3 | 0 | 0 |

Fig.15

| task ID | source node | destination node | active resources | backup resources | recovery execution process | guaranteed band |
|---|---|---|---|---|---|---|
| 1-1 | 101-1 | 101-7 | 300-2 downlink/300-7 downlink/400-1 | 300-1 downlink/300-8 downlink | 202-7 | 2 |

Fig.16

| resource | capacity | active bands in use | all backup bands reserved | backup bands reserved by its own process |
|---|---|---|---|---|
| 300-1 downlink | 10 | 0 | 0 | 4 |
| 300-1 uplink | 10 | 0 | 0 | 0 |
| 300-2 downlink | 10 | 2 | 3 | 0 |
| 300-2 uplink | 10 | 0 | 0 | 0 |
| 300-3 downlink | 10 | 0 | 7 | 0 |
| 300-3 uplink | 10 | 9 | 0 | 0 |
| 300-4 downlink | 20 | 0 | 0 | 0 |
| 300-4 uplink | 20 | 7 | 0 | 0 |
| 300-5 downlink | 10 | 0 | 0 | 0 |
| 300-5 uplink | 5 | 0 | 0 | 0 |
| 300-6 downlink | 10 | 7 | 0 | 0 |
| 300-6 uplink | 10 | 0 | 0 | 0 |
| 300-7 downlink | 10 | 6 | 0 | 0 |
| 300-7 uplink | 10 | 0 | 0 | 0 |
| 300-8 downlink | 10 | 0 | 6 | 4 |
| 300-8 uplink | 10 | 0 | 0 | 0 |
| 300-9 downlink | 10 | 2 | 0 | 0 |
| 300-9 uplink | 10 | 0 | 0 | 0 |
| 300-10 downlink | 10 | 0 | 0 | 0 |
| 300-10 uplink | 10 | 0 | 7 | 7 |
| 400-1 | 20 | 2 | 0 | 0 |
| 400-4 | 5 | 2 | 0 | 0 |
| 400-5 | 10 | 9 | 0 | 0 |

Fig.17

| task ID | source node | destination node | active resources | backup resources | recovery execution process | guaranteed band |
|---|---|---|---|---|---|---|
| 3-1 | 101-3 | 101-6 | 300-4 downlink/300-5 downlink/400-5 | 300-3 uplink/300-2 downlink/400-1 | 202-6 | 3 |
| 3-2 | 101-3 | 101-8 | 300-4 downlink/300-9 downlink/400-4 | - | - | 2 |
| 3-3 | 101-3 | 101-7 | 300-4 downlink/300-6 downlink/300-7 downlink/400-5 | 300-3 uplink/300-1 downlink/300-8 downlink/400-1 | 202-6 | 4 |

Fig.18

| resource | capacity | active bands in use | all backup bands reserved | backup bands reserved by its own process |
|---|---|---|---|---|
| 300-1 downlink | 10 | 0 | 6 | 6 |
| 300-1 uplink | 10 | 0 | 0 | 0 |
| 300-2 downlink | 10 | 2 | 3 | 0 |
| 300-2 uplink | 10 | 0 | 0 | 0 |
| 300-3 downlink | 10 | 0 | 0 | 0 |
| 300-3 uplink | 10 | 9 | 7 | 4 |
| 300-4 downlink | 20 | 0 | 0 | 0 |
| 300-4 uplink | 20 | 7 | 0 | 0 |
| 300-5 downlink | 10 | 0 | 0 | 0 |
| 300-5 uplink | 5 | 7 | 0 | 0 |
| 300-6 downlink | 10 | 0 | 0 | 0 |
| 300-6 uplink | 10 | 6 | 0 | 0 |
| 300-7 downlink | 10 | 0 | 0 | 0 |
| 300-7 uplink | 10 | 0 | 6 | 6 |
| 300-8 downlink | 10 | 2 | 0 | 0 |
| 300-8 uplink | 10 | 0 | 0 | 0 |
| 300-9 downlink | 10 | 0 | 0 | 0 |
| 300-9 uplink | 10 | 0 | 0 | 0 |
| 300-10 downlink | 10 | 0 | 0 | 0 |
| 300-10 uplink | 10 | 2 | 7 | 4 |
| 400-1 | 20 | 2 | 0 | 0 |
| 400-4 | 5 | 2 | 0 | 0 |
| 400-5 | 10 | 9 | 0 | 0 |

Fig.19

| task ID | source node | destination node | active resources | backup resources | recovery execution process | guaranteed band |
|---|---|---|---|---|---|---|
| 1-1 | 101-1 | 101-7 | 300-2 downlink/300-7 downlink | 300-1 downlink/300-8 downlink | 202-7 | 2 |
| 3-3 | 101-3 | 101-7 | 300-4 downlink/300-5 downlink/300-6 downlink/300-7 downlink/400-5 | 300-3 uplink/300-1 downlink/300-8 downlink/400-1 | 202-7 | 4 | ure managing function results in a vulnerability of the
DISTRIBUTED RESOURCE MANAGING SYSTEM, DISTRIBUTED RESOURCE MANAGING METHOD, AND DISTRIBUTED RESOURCE MANAGING PROGRAM The present application is the National Phase of PCT/JP2009/052631, filed Feb. 17, 2009, which is based upon and claims the benefit of priority from Japanese patent application No. 2008-089325, filed on Mar. 31, 2008, the disclosure of which is incorporated herein in its entirety by reference.

TECHNICAL FIELD

The present invention relates to the art of a resource managing process on a communication network where each of a plurality of tasks can use a plurality of resources.

BACKGROUND ART

When a resource on a communication network suffers a fault, it can automatically be remedied if a dedicated backup resource has been assigned in advance to a task which is using the resource and there are available a means for detecting a fault and a means for switching to the backup resource.

However, the assignment of dedicated backup resources to all tasks is problematic because it is necessary to have as many backup resources as or more backup resources than active resources available, making the cost of resources high. One effective solution to the problem is to reduce the total number of required resources by sharing backup resources among a plurality of tasks.

If a backup resource is shared by a plurality of tasks, then when the tasks suffer a fault at the same time, one of the faulty tasks can be remedied though the other tasks cannot be remedied. Therefore, if a backup resource is shared by a plurality of tasks, then the probability of recovery is lower than if dedicated backup resources are available for respective tasks. For preventing the probability of recovery from being lowered, it is effective to avoid the sharing of a backup resource between tasks which are highly likely to be simultaneously susceptible to failure.

Backup resource assignment processes based on such principles have been actively studied in the field of backbone communication infrastructure designs whose fault solutions tend to have large social and economical impacts. In particular, attention has been drawn in recent years to a backup route setting technology based on SRLG (Shared Risk Link Group) wherein communication resources which are highly likely to suffer a fault simultaneously are grouped together. SRLG refers to a group of resources which are simultaneously disabled by a single faulty event.

Insofar as tasks use backup resources which recover different tasks, but do not use resources belonging to the same SRLG as active resources, it is possible to avoid a conflict of recovery resources in the even of a single fault. Non-patent document 1 reveals that under such a condition, the complexity of a problem for assigning backup resources for overall optimization is NP-complete.

Non-patent document 2 proposes a scheme for calculating a resource utilization plan in a realistic calculation time by limiting possible combinations and hierarchizing resources so that they can be dissolved into small-scale problems.

The above examples are known examples relating to an intensive solution for a single process to calculate a resource assigning optimizing problem, in case that a list of utilization tasks relative to all SRLGs addressed by the problem can be known.

However, depending on one calculation process for the route determining function results in a vulnerability of the network managing function. To avoid such a drawback, it is desirable to employ a distributed backup route setting scheme where the management process of each task individually determines a backup resource. Non-patent document 3 proposes a distributed shared backup route setting scheme where tasks are communication paths and the task management process is a source node of each of the communication paths.

In order for a starting node to set a backup path capable of guaranteeing a recovery for a single fault, it is necessary to collect and hold the information of a band assigned to recover each SRLG from all resources to be searched for (only links are dealt with in Non-patent document 3). The amount of information to be held by the source node is on the order of the square of the number of resources on the entire network. Therefore, on large-scale networks, the exchange of information is likely to put pressure on the band and the processing capability.

In either one of the above examples, since the same recovery path is provided against a fault of any SRLGs through which the active communication path runs, only resources which do not belong to any SRLGs are selected as backup resources.

If backup resources are individually selected for SRLGs through which the active communication path runs, then it is possible to assign resources with higher efficiency. Non-patent document 4 proposes a process of selecting a backup resource such that a node for setting the backup resource will recover a fault of all SRLGs with a combination of recovery paths.

In this example, however, a node for selecting resources needs to hold information on the order of the square of the number of resources. If the resources are incorporated in a distribution fashion on a large-scale network, then the exchange of information is likely to put pressure on the band and the processing capability.

In the above examples, the problems posed when resources with SRLGs not overlapping those of active resources are selected as backup resources which a certain task can share with other tasks have been pointed out. In order to start using a selected resource or reserve a selected resource as a backup resource, a signaling process for the selected resource is required. For example, RSVP-TE (Non-patent document 5) is known as a signaling scheme for acquiring resources. Such a signaling scheme is applicable to the reservation of active resources which is to be carried out prior to the start of communications.

The reservation of a backup resource is permitted on the condition that a band required to recover an SRLG with the same resource will not exceed the capacity that can be used as the backup resource upon the reservation. To judge the capacity, it is necessary to have information as to what active resource is acquired by the task to be remedied. Since such information is held by a node which has selected a resource, if the selection of backup resources disclosed in Non-patent documents 3, 4 is incorporated in a distributed fashion, the information may be included in a backup resource reservation request message. A resource reservation signaling protocol including such an expansion is proposed in Non-patent document 6 and Patent document 1.

However, either of the examples is disadvantageous in that since all the signaling of active and backup resources needs to be finished before a task for guaranteeing a recovery for a single fault starts to be used, the delay from the sending of a request to the start of use of the task is large. Furthermore, aside from the above problem of the band consumed by the exchange of information about a resource state, there is a problem in that when many requests are coming in, the signaling traffic tends to put pressure on the communications and the processing capability.

In order that a backup resource that can be shared with other tasks is used to execute a fault recovery, a signaling process for determining which one of a plurality of tasks that is to be remedied will use the backup resource is needed even if the backup resource is reserved. At this time, if a plurality of recovery paths are defined as disclosed in Non-patent document 4, then a node for activating a recovery process has to identify an SRLG which has suffered a fault in order to determine which one of the recovery paths is to be used to recover the fault. If RSVP-TE is applied simultaneously to the recovery paths, not just to one recovery path, then the recovery time will be long due to a conflict of resources and the band will be consumed greatly by signaling messages. The difficulty may be avoided by using a signaling scheme having a scope including a plurality of paths, as disclosed in Patent document 2.

However, the above solution poses problems in that a node (a source node or a destination node) for activating a recovery process needs to be uniquely determined with respect to a communication path and, if a node which has detected an SRLG fault is far from a recovery process activation node owing to a communication path with a high hop count, then the consumption of time and a band for indicating the fault to the recovery process activation node are significant.

To make communication tasks highly reliable, there has been studied a scheme for recovering each transmission span of different communication paths that are multiplexed, rather than each task as a communication path (Non-patent document 7). However, since one recovery link is assigned to all tasks using resources in the span in question, resources are selected inefficiently for some tasks, and resource utilization efficiency on the overall network is lower than with the examples of Non-patent documents 1 through 4 (Non-patent document 8).

Non-patent document 1: S. Yuan and J. P. Jue, "Dynamic Lightpath Protection in WDM Mesh Networks under Risk-Disjoint Constraints," in Proceedings of IEEE Globecom 2004, pp. 1770-1774 (2004);

Non-patent document 2: H. Matsuura, N. Murakami, K. Takami, "Disjoint SRLG Routing for GMPLS Networks by Hierarchically Distributed PCE," IEICE Trans. Commun., Vol. E90-B, No. 1, pp. 51-61 (2007);

Non-patent document 3: E. Bouillet and J.-F. Labourdette, "Distributed Computation of Shared Backup Path in Mesh Optical Networks Using Probabilistic Methods," IEEE/ACM Transactions on Networking, Vol. 12, No. 5, pp. 920-930 (2004);

Non-patent document 4: Z.-Li Tang and X.-M. Li, "A Mixed Shared and Multi Paths Protection Scheme with SRLG Constraints," in Proceedings of 8th ACIS Intl Conf. on Software Engineering, Artificial Intelligence, Networking, and Parallel/Distributed Computing, pp. 60-65 (2007);

Non-patent document 5: "RSVP-TE: Extensions to RSVP for LSP Tunnels," RFC3209;

Non-patent document 6: "Signaling Extension for the End-to-End Restoration with SRLG," internet draft, draft-choi-ccamp-e2e-restoration-srig-01.txt;

Non-patent document 7: "Generalized Multi-Protocol Label Switching (GMPLS) Recovery Functional Specification," RFC4426;

Non-patent document 8: "Analysis of Generalized Multi-Protocol Label Switching (GMPLS)-based Recovery Mechanisms (including Protection and Restoration)," RFC4428;

Non-patent document 9: "Traffic Engineering (TE) Extensions to OSPF Version 2," RFC3630;

Patent document 1: JP NO. 2007-129782A

Patent document 2: U.S. Pat. No. 7,289,450

DISCLOSURE OF THE INVENTION

The present invention has been made in view of the above problems. It is a task of the present invention to provide a distributed resource managing system, a distributed resource managing method, and a distributed resource managing program which are capable of reducing the signaling traffic and processing load, avoiding temporal and spatial load concentrations, and which make it easy to introduce a task recovery guarantee into a large-scale network by localizing resource selection and recovery processing.

To achieve the above task, a distributed resource managing system according to the present invention comprises one or more resource managing processes corresponding to each of predefined events that change the states of resources, on a communication network where each of a plurality of tasks can use a plurality of resources, wherein each of said one or more resource managing processes comprises:

an assignor which, when it receives a request to protect any specific task against the event that changes states of resources to which its own process corresponds, assigns backup resources including a resource already selected by another resource managing process to the task in such a way that all tasks requested to be protected which use the resource can be protected from said event that changes the states of resources; and an indicator which indicates information of the assigned backup resources to one or more recovery execution processes.

A distributed resource managing method according to the present invention uses one or more resource managing processes corresponding to each of predefined events that change the states of resources, on a communication network where each of a plurality of tasks can use a plurality of resources, wherein each of said one or more resource managing processes comprises:

when it receives a request to protect any specific task against the event that changes states of resources to which its own process corresponds, assigning backup resources including a resource already selected by another resource managing process to the task in such a way that all tasks requested to be protected which use the resource can be protected from said resource states changing event; and indicating information of the assigned backup resources to one or more recovery execution processes.

A distributed resource managing program according to the present invention enables a computer to function as the each of the one or more resource managing processes.

According to the present invention, backup resources are selected not by task managing processes at source and destination nodes of a communication path as a task, but independently by a plurality of resource managing processes which correspond to events that change the states of the resources used by the task. Thus, the signaling traffic and the processing load are reduced, and the temporal and spatial load concentrations are avoided. It is made easy to introduce a task recovery guarantee into a large-scale network by localizing resource selection and recovery processing.

BRIEF DESCRIPTION OF THE DRAWINGS

FIG. 3 is a diagram showing a portion of the content of a database held by resource managing process 201-5;

FIG. 4 is a diagram showing a portion of the content of a database held by resource managing process 201-5;

FIG. 5 is a diagram showing a portion of the content of a database held by resource managing process 201-6;

FIG. 6 is a diagram showing a portion of the content of a database held by resource managing process 201-6;

FIG. 7 is a diagram showing an example of information of task 3-3 registered in resource managing process 201-5;

FIG. 8 is a diagram showing an example of information of task 3-3 registered in resource managing process 201-6;

FIG. 9 is a diagram showing an example of a list of resource states reflecting signaling results according to a link-state routing protocol in resource managing process 201-5;

FIG. 10 is a diagram showing an example of a list of resource states reflecting signaling results according to a link-state routing protocol in resource managing process 201-6;

FIG. 12 is a diagram showing a portion of a database of resource states managed by resource managing process 201-5;

FIG. 13 is a diagram showing a portion of a database of via-center tasks managed by resource managing process 201-5;

FIG. 14 is a diagram showing a portion of a database of resource states managed by resource managing process 201-6;

FIG. 15 is a diagram showing a portion of a database of via-center tasks managed by resource managing process 201-6;

FIG. 16 is a diagram showing an example of a list of resource states reflecting signaling results according to a link-state routing protocol in resource managing process 201-5;

FIG. 17 is a diagram showing an example of a list of tasks reflecting signaling results according to a link-state routing protocol in resource managing process 201-5;

FIG. 18 is a diagram showing an example of a list of resource states reflecting signaling results according to a link-state routing protocol in resource managing process 201-6; and FIG. 19 is a diagram showing an example of a list of tasks reflecting signaling results according to a link-state routing protocol in resource managing process 201-6.

BEST MODE FOR CARRYING OUT THE INVENTION

The best mode for carrying out the invention will be described in detail below with reference to the drawings.

(First Exemplary Embodiment)

First, a distributed resource managing system according to a first exemplary embodiment of the present invention will be described below.

Figure 1:
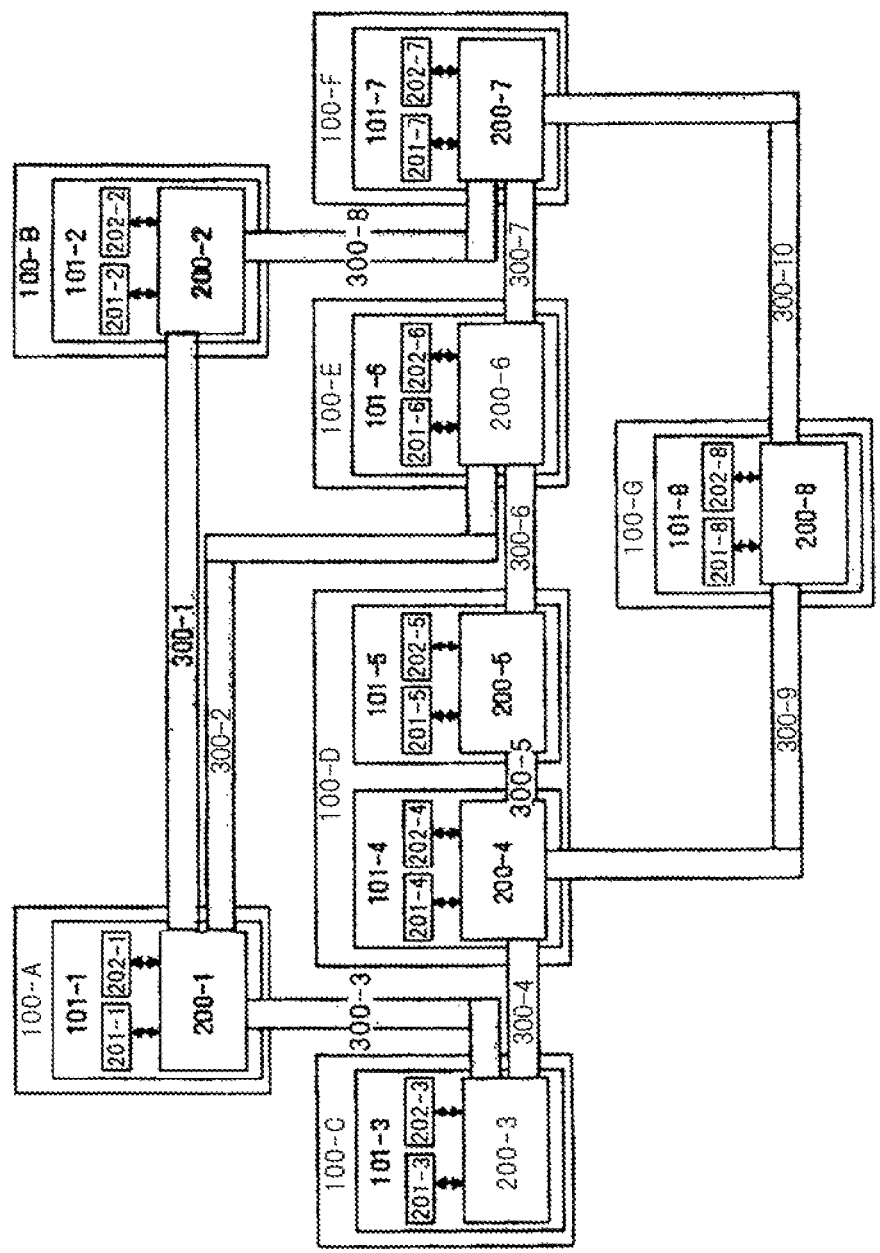
FIG. 1 is a diagram showing a configurational example of a distributed resource managing system according to a first exemplary embodiment of the present invention.

FIG. 1 shows a configurational example of the distributed resource managing system according to the first exemplary embodiment of the present invention.

In FIG. 1, 100-A, 100-B, ..., 100G denote centers such as office buildings and data centers, and 101-1, 101-2, ..., 101-8 node apparatuses (hereinafter referred to as "nodes").

Each node includes exchange 200, resource managing process 201, and communication task managing process 202. It is assumed that each communication task can be carried out insofar as a transfer band from a source node to a destination node is maintained. On a communication network as shown in FIG. 1 where a plurality of tasks can use a plurality of resources, respectively, one or more resource managing processes 201 correspond to each of the events that change the states of the resources which have been defined in advance.

Each resource managing process 201 has an assignor which, when it receives a request to protect any specific task against an event that changes states of resources, to which its own process corresponds, assigns (selects) backup resources including a resource already selected by another resource managing process to the task in such a way that all tasks requested to be protected which use the resource can be protected from the resource state changing event, and an indicator which indicates information of the assigned backup resources (the result of selection of the backup resource) to one or more recovery execution processes. The indicator determines a recovery execution process for the combination of the corresponding resource state changing event and task, and indicates information of the backup resource which the task is to use when the resource state changing event occurs, to the recovery execution process. When each resource managing process 201 receives an indication of the updating of the resource state, it optimizes the backup process selection using only the data held by its own process.

The transfer band between nodes used by the task is provided by transmission channel 300 connected to exchange 200.

Communication task managing process 202 also doubles as the recovery execution process in operation. The recovery execution process is determined for each influential event defined as paired with the task and the resource state changing event. When communication task managing process 202 detects a state change of the task to which the information of the corresponding backup resource is indicated or detects the occurrence of the resource state changing event to which resource managing process 201 as the source of the indication corresponds, communication task managing process 202 activates a process of recovering the task.

In other words, resource managing process 201 indicates the result of selection of the backup resource to communication task managing process 202, and the recovery execution process activates a process of recovering the task when it detects a resource state change included in an influential event to which its own process corresponds or a task state change.

Resource managing process 201 and communication task managing process 202 may be installed as separate software (distributed resource managing programs or the like) on the same hardware, or may have their functions exist together in the same software.

Transmission channel 300 comprises a bidirectional transmission channel. For illustrative purposes, transmission channel 300-$z$ extends between node 100-$x$ and node 100-$y$, and if "$x<y$", a transmission channel oriented from 100-$x$ to 100-$y$ is referred to as a downlink transmission channel of 300-$z$ and a transmission channel oriented from y to x as an uplink transmission channel of 300-$z$.

Communication task managing processes 202 from among all nodes that share the band utilization status of transmission channels 300-1, 300-2, ..., 300-10 according to a link-state routing protocol such as an extended OSPF-TE (see Non-patent document 9), for example. The shared information about the transmission channels includes a transmission channel capacity, a band used as an active resource, and a band reserved as a backup resource. The link-state routing protocol serves as an example of an information sharer which shares state information of resources that can be selected as backup resources among different resource managing processes 201.

According to the present exemplary embodiment, a state changing event which is assumed to be a fault refers to a center fault caused by a natural disaster or an attack. For example, it is assumed that when center 100-D suffers a fault, both nodes 101-4, 101-5 are disabled. According to the present invention, since a resource managing process needs to be uniquely associated with a state changing event, it has to be determined in advance which one of resource managing processes 201-4, 201-5 should deal with the fault of center 100-D. Here, it is assumed that resource managing process 201-5 deals with the fault of center 100-D. For recovering a task which goes through node 101-4, but not node 101-5 from the fault of center 100-D, it is necessary to perform signaling for executing the task on not only resource managing process 201-4 but also on resource managing process 201-5. If the content of the databases of resource managing processes 201-4, 201-5 can be synchronized with each other at all times, then both may deal with the fault of center 100-D. Faults of the other centers shown in FIG. 1 are dealt with by respective resource managing processes 201 that belong solely to the respective centers.

Operation of the first exemplary embodiment will be described below.

It is assumed that in the communication network shown in FIG. 1, a task start request for band-guarantee communications from node 101-3 to node 101-7 is sent from task managing process 202-3. It is also assumed that task managing process 202-3 specifies a route made up of nodes 101-3, 101-4, 101-5, 101-6, 101-7 and transmission channels interconnecting those nodes. At this time, a signaling message of the task start request is transferred through channels shown in FIG. 2.

A resource managing process which has received the signaling message selects a backup resource for a signaled task based on a list of tasks to be recovered which use resources influenced by an event that changes the states of resources (center fault) to which its own process corresponds, and information about a link band utilization and reservation status of the entire network which is updated by the link-state routing protocol. However, since the resource managing process which corresponds to the fault of center 100-D is denoted by 202-5, resource managing process 202-4 does not select a backup resource (but maintains an active resource) though it is on the signaling route.

Operation of resource managing process 201-5 for selecting a resource will be described below as an example of the operation of a resource managing process for selecting a backup resource.

It is assumed that a resource selected by task managing process 202-3 is specified as an active resource in the signaling message, and that the processing load of node 202-5 and the bands of the downlink transmission channels of transmission channels 300-5, 300-6 are specified for resource managing process 201-5. Resource managing process 201-5 confirms that these resources are available. Resource managing process 201-5 actively selects a backup resource according to a sequence to be described below. After the selecting sequence is ended, the signaling message is transferred to resource managing process 201-6 in a down-stream node.

Figure 2:
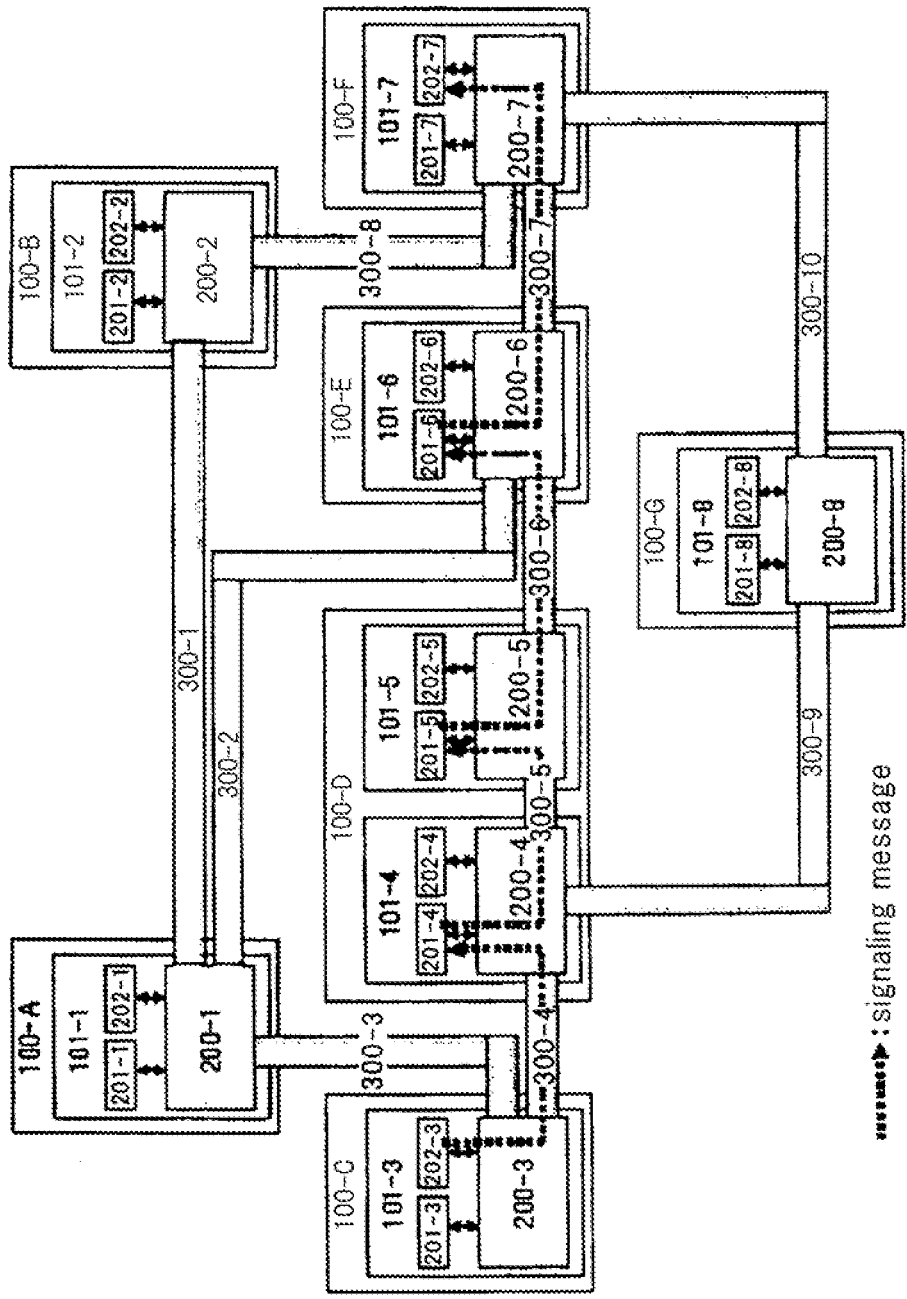
FIG. 2 is a diagram showing a route for transferring a signaling message in the first exemplary embodiment.

FIGS. 3 and 4 show portions of the content of databases held by resource managing process 201-5 before it receives the signaling message of the task start request shown in FIG. 2.

FIG. 3 shows a list of resources that can be used as backup resources obtained according to the link-state routing protocol. For the sake of brevity, only transmission channels are listed (on the assumption that if transmission channels can be reserved, then the processing capability of nodes for transferring data between those transmission channels are necessarily available). In FIG. 3, "ACTIVE BANDS IN USE" represents the total of bands that are used as active resources by all tasks, "ALL BACKUP BANDS RESERVED" the total of bands that are reserved as backup resources by all tasks, and "BACKUP BANDS RESERVED BY ITS OWN PROCESS" the total of bands that are reserved by its own process.

FIG. 4 shows a list of tasks which use resources managed by its own process. It can be seen from FIGS. 3 and 4 that a task (task ID=3-1) of band-guarantee communications from node 101-3 to node 101-6 reserves transmission channels 300-2, 300-3 as backup resources. Though there is also another task (task ID=3-2) of band-guarantee communications from node 101-3 to node 101-6, no backup resource is assigned to this task. The reason why no backup resource is assigned to this task may be that the corresponding task managing process is not requesting a fault recovery.

It is assumed that resource managing process 201-5 receives a start request signaling message for a new task (task ID=3-3) through the route shown in FIG. 2 and task managing process 202-3 as a signaling source requests that the task to use a band of "4".

In order for the task to be recoverable from the fault of center 100-D, it is effective, for example, to reserve the bands of transmission channels 300-3, 300-2 as backup resources by "4" and to use these resources to maintain a route from node 101-3 via node 101-1 to node 101-6 in the event of a fault. This route will be referred to as route 1. The task is also recoverable by reserving the bands of transmission channels 300-3, 300-1, 300-8 by 4 and using a route from node 101-3 via nodes 101-1, 101-2 to node 101-7. This route will be referred to as route 2. Resource managing process 201-5 compares cost increases incurred when resources included in all recoverable routes are reserved, and select backup resources that make up the route in which the cost increase is the lowest. For example, a cost function represented by the following equation (1):

$$\text{Route cost} = \text{the sum of ratios (transmission channel capacity/idle capacity) for all transmission channels making up a route} \quad (1)$$

is used to calculate cost increases of the routes. According to the cost function, the lowest cost increase is achieved when route 2 is selected. The idle capacity is represented by the following equation (2):

$$\text{Idle capacity} = \text{transmission channel capacity} - \text{active bands in use} - \text{all backup bands reserved} \quad (2)$$

It is assumed that with respect to resource S where all backup bands that are reserved are represented by r and backup bands that are reserved by its own process are represented by w, if a new band is reserved as a backup resource by w', then backup bands W that are reserved by its own process and all backup bands R that are reserved are expressed by the following equations (3) and (4):

$$W = w + w' \quad (3)$$

$$R = \text{Max}(W, r) \quad (4)$$

Consequently, if all backup bands that are reserved are more than the backup bands that are reserved by its own process which are increased by the new reservation, then the cost increase due to the present reservation is nil. This reflects the fact that backup resources for faults dealt with by its own process and backup resources for faults dealt with by other resource managing processes can be shared. Since these backup resources are not used simultaneously and since only the greater bands at worst are used in the event of a fault, the idle capacity is not influenced unless the backup bands that are reserved by its own process exceed the backup bands that are reserved by the other processes. According to the route that is selected by the above cost function, therefore, all tasks can be recovered in the event of any single center fault (if the idle capacity is nil, then the cost is infinitely large and the selected route is disabled). Any desired cost function can be selected insofar as it guarantees no conflicts between resources to be recovered in the event of a single fault. For example, a parameter such as the reliability of the transmission channels may be included in addition to the above elements. A task which is dividable into routes may not be recovered by a singe route, but a recovery band may be distributed to a plurality of routes.

Based on the above calculations, resource managing process 201-5 inserts the result of selection comprising a list of resources included in route 2 and the result of selection of a recovery execution process into the task start request signaling message, and transfer the task start request signaling message to a downstream resource managing process. Since the resource managing process is a process for performing a recovery in the event of a center fault, it needs to be outside center 100-D. For example, if a resource managing process is selected primarily for the reasons of saving a signaling band and a position easy to detect a fault, then the resource managing process may possibly be task managing process 202-6 or 202-7 that is located on the signaling route of the active resource. If the task managing process of the signaling source is specified in the signaling message or if the task managing process in the source node and the destination node is determined according to the system default, then a resource managing process is selected according to those specified or according to a determined task managing process. According to the present exemplary embodiment, task managing process 202-6 is selected as a recovery execution process for an influential event defined by task ID=3-3 and center ID=100-D.

Operation of resource managing process 201-6 which has received the task start request signaling message transferred from resource managing process 201-5 through the route shown in FIG. 2 will be described below.

First, an influential event defined by task 3-3 and center 100-D is registered as an object to be recovered by task managing process 202-5 in the same node. In addition, a backup resource for recovering task 3-3 in the event of center 100-E is selected by the same process as that carried out by resource managing process 201-5.

FIGS. 5 and 6 show portions of the contents of databases held by resource managing process 201-6. Since both resource managing processes 201-5, 201-6 share resource information according to the same link-state routing protocol, the difference between those shown in FIGS. 5 and 6 and those shown in FIGS. 3 and 4 is only backup bands reserved by its own process. It can be seen from FIGS. 5 and 6 that the task of task ID=1-1 has reserved bands of transmission channels 300-1, 300-8 as backup resources. As with resource managing process 201-5, resource managing process 201-6 calculates the costs of all recovery sources capable of recovering tasks 3-3 according to the equations (1) through (4), and obtains the result that the route extending from node 101-4 via node 101-8 to node 101-7 (transmission channels 300-9, 300-10 are reserved) incurs the lowest cost increase. Accordingly, transmission channels 300-9, 300-10 are selected as backup resources for an influential event defined by task ID=3-3 and center ID=100-E. Furthermore, task managing process 202-7, for example, is selected as a recovery execution node for the same influential event. Resource managing process 201-6 transfers the result to task managing process 202-7 which serves as a next task start request signaling destination shown in FIG. 2.

If the above forward route signaling is successful, then the information of task 3-3 is registered in resource managing processes 201-5, 201-6 by backward signaling as shown in FIGS. 7 and 8, respectively.

The operation of the present exemplary embodiment is summarized as follows: Depending on resource maintaining signaling for tasks which are required to be guaranteed for a recovery from a signal fault (i.e., when a task protection request is received), each resource managing process selects a backup resource based on a resource state list and a task list stored in its own database so that all tasks requested to be protected which use resources can be protected against an event that changes the states of resources, and indicates the result to a recovery execution node.

According to the background art shown in Non-patent documents 1 through 4, it is assumed that a particular node selects a backup route for each task or the entire network. In this case, according to the present invention, it is necessary that a list (FIGS. 4 and 6) of tasks extending through the centers or information about limitations placed by the tasks on the selection of resources, which is individually managed by each resource managing process, be concentrated on nodes for selecting routes. It can be understood that communications for exchanging task information between podes which are thus caused can be dispensed with according to the present invention.

Signaling for reserving backup resources have not been referred to above. Several implementations are possible for such signaling. One implementation is a method of performing a resource managing process which has selected a backup resource or a recovery execution process for each influential event. According to this method, with respect to an influential event defined by task 3-3 and center 100-D, for example, corresponding resource managing process 201-5 or recovery execution process 202-6 performs signaling on resource managing processes 201-3, 201-1, 201-2, 201-7 for reserving selected back resources 300-3, 300-1, 300-8. Alternatively, task managing process 202-7 which has maintained an active resource and selected a backup resource or task managing process 202-3 to which the result has returned therefrom may perform signaling. In this case, it is necessary to perform signaling on resource managing processes 201-3, 201-1, 201-2, 201-7, 201-8 for reserving backup resources 300-3, 300-1, 300-8, 300-9, 300-10 against influential events for both centers 100-D, 100-E. At any rate, the recovery execution node judges that a backup resource is actually available after having obtained the results of backup resource reservation signaling. The indication of the result of signaling to the recovery execution node is obvious if the backup resource reservation signaling sending process is the recovery execution process itself. However, the result of signaling needs to be indicated separately to the recovery execution node if the backup resource reservation signaling sending process is a task managing process, unless a task managing process doubles as the recovery execution process. The backup resource reservation signaling sending process which is a resource managing process will be described later.

If a task managing process performs backup resource reservation signaling, then the amount of communications of backup resource reservation signaling is represented by the sum of the amounts of signaling communications from the task managing process to the sum of the sets of backup resources selected by a resource managing process corresponding to an event that changes the states of resources that affects the active resource of the task. If resource managing processes successively select backup resources along the route of task start signaling route as shown in FIG. 2, then the sum of the sets of backup resources can be reduced by reflecting the result of selection of a backup resource by an upstream resource managing process in the selection of a backup resource by a downstream resource managing process. Therefore, the signaling cost can be reduced. Specifically, the selection of a backup resource by each resource managing process may be carried out in order to minimize the number of resources not included in the sum of sets of backup resources selected by a resource managing process which is located upstream of its own process. Such a selection can be made by changing the cost function according to the equation (1) to increase the cost of resources not included in the sum of the sets of backup resources selected by an upstream resource managing process.

Resources whose cost increase calculated according to equations (2) through (4) is nil, i.e., resources whose cost increase due to the reservation of backup resources by its own process is nil, may be considered to be maintained at the time the resource information is updated by the link-state routing protocol. However, signaling is nevertheless required in order to prevent a backup resource selected by its own process from being not maintained due to a release by another resource managing process which has reserved the resource. For example, when each resource managing process receives a release request from another process, if all backup bands that are reserved are reduced according to equation (4), then the reduced resources are advertised as "TO BE RELEASED" and are actually released after a certain time T. The signaling for reserving backup resources is thus sufficient if completed within T except for resources to be released, and does not necessarily need to be performed immediately after backup resources are selected (the signaling for reserving backup resources is completed not immediately after backup resources are determined, but subsequently within T). In this manner, the timing of signaling is distributed, and the communication load is prevented from being concentrated in a short time. As a result, in a situation where there are many reserved backup resources, i.e., in a situation where the utilization ratio of the network band is large and the network load is large, the concentration of the signaling load is reduced.

After the signaling for backup resources, the list of resource states which have reflected the result of the signaling according to the link-state routing protocol is updated in resource managing processes 201-5, 201-6 as shown in FIGS. 9 and 10, respectively. As the list is thus updated, each resource managing process can further optimize the backup process selection using only the data held by its own process. For example, as shown in FIG. 10, since all backup bands that are reserved and backup bands that are reserved by its own process are equal to each other for the uplink transmission channel of resource 300-9 and even if the uplink transmission channel of resource 300-10, it is expected from the equation (4) that all backup bands that are reserved are reduced when backup bands that are reserved by its own process are reduced. The value of (all backup bands that are reserved— backup bands that are reserved by its own process) is "2" for the downlink transmission channel of resources 300-1, 300-8 and "7" for the uplink transmission channel of resource 300-3. Consequently, even if only "2" of backup band 4 that is presently borne by route (route A) using the downlink transmission channel of resource 300-9 and the uplink transmission channel of resource 300-10 is distributed to route (route B) using the uplink transmission channel of resource 300-3, the downlink transmission channel of resource 300-1, and the downlink trans-mission channel of resource 300-8, the cost of route B will not be increased. The cost of route A remains the same or is reduced. Inasmuch as the above details can be known from only information held by resource managing process 201-6, resource managing process 201-6 can judge that the selection of backup resources should be changed as described above for reducing the cost. If the judgement is transmitted to the recovery execution process and signaling is performed on a newly selected backup resource (it may be performed on resources that are not to be released within the certain time T) at the time of the judgement, the route can be changed without directly indicating to the other resource processes and the request source task managing process.

When a resource managing process performs signaling for reserving a backup resource, the result is awaited and then the task start request signaling shown in FIG. 2 may be transferred to the next resource managing process. In this case, if the result of the reservation of the backup resource is included in the signaling message, then a downstream resource managing process which has received the signaling message can reflect the result of the reservation in the resource state database. In other words, when resource managing process 201-6 selects a backup resource for task 3-3, the same information as shown in FIG. 10 can be referred to without waiting to be updated according to the link-state routing protocol, thereby allowing an optimum resource to be selected at an earlier time.

The above description of the operation is based on the premise that each task needs to preserve a backup resource selected by a resource managing process before an actual task recovery process is required (due to a fault detection). However, a task may be defined which requests a resource managing process to select a backup resource and transmit the result of the selection to a recovery execution process, but which does not request any process to reserve the selected backup resource before a task recovery process is activated. Whether a selected backup resource needs to be reserved before a task recovery process is activated or not may be determined based on the value of the type field of a protection request included in a task activation signaling message, for example. In this case, though a recovery from a single state changing event is not guaranteed for a task which selects, but does not reserve, a backup resource, the recovery execution process holds a backup route having a high recovery success probability. Such a task is given a reliability which is lower than tasks that reserve a backup resource but higher than tasks that do not select a backup resource (such as task ID 3-2).

(Second Exemplary Embodiment)

A distributed resource managing system according to a second exemplary embodiment of the present invention will be described below.

Figure 11:
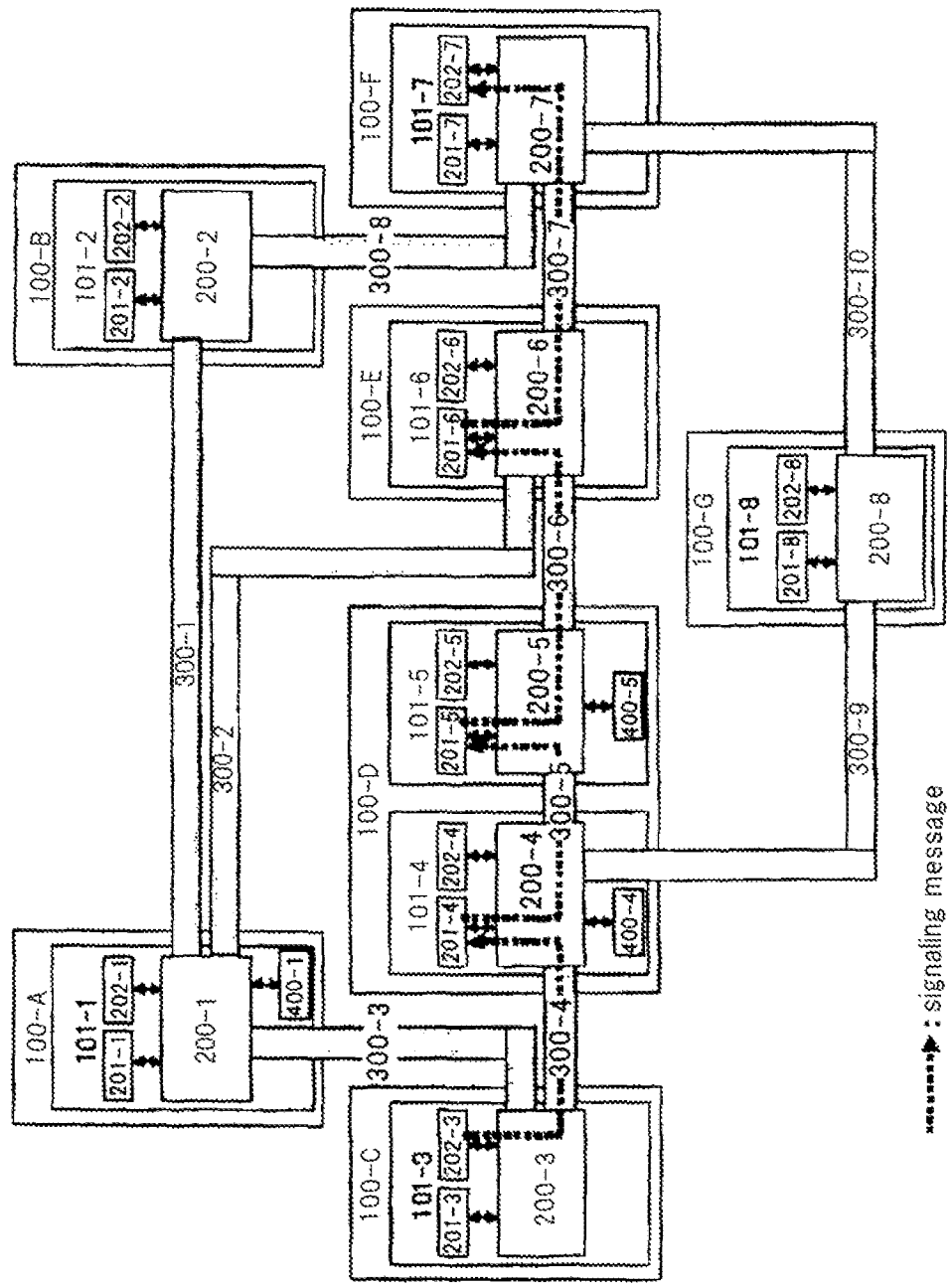
FIG. 11 is a diagram showing a configurational example of a distributed resource managing system according to a second exemplary embodiment of the present invention and a route for transferring a signaling message.

It is assumed that a communication task according to the above exemplary embodiment can be carried out if the transfer band from a source to a destination is maintained. The present invention is also applicable to a task which needs to reserve a resource other than the transfer band. FIG. 11 shows a configurational example according to the second exemplary embodiment and a route for transferring a signaling message.

As shown in FIG. 11, some nodes 101-x include data processors 400-x. Some tasks according to the present exemplary embodiment can be carried out when the transfer band from a source to a destination and a data processing throughput are maintained. Data processing is assumed to be data encryption or codec conversion of video and audio data. These processes accompany the consumption of the throughput of the data processors, and the total throughput of the data processors for the processes is fixed. The throughput utilization and reserved statuses of the data processors, together with the band utilization and reserved statuses of transmission channel resources, are shared by the nodes. FIGS. 12 and 13 show portions of databases of resource states and via-center tasks managed by resource managing process 201-5. FIGS. 14 and 15 show portions of databases of resource states and via-center tasks managed by resource managing process 201-6. Data processing is assumed to be a process which is performed only once on a route for each task, such as data encryption or codec conversion. Therefore, task 3-1, for example, goes through two nodes 101-4, 101-5 each having data processor 400, and only one data processor 400-5 performs data processing on the task.

It is assumed, as with the previous exemplary embodiment, that task managing process 202-3 sends a request for activating a task of task ID=3-3 that is guaranteed for recovery from a single center fault from nodes 101-3 to 101-7. It is also assumed that the task needs a single data processing process. A signaling route is shown in FIG. 11, and transmission channels 300-4, 300-5, 300-6, 300-7 and data processor 400-5 are selected as active resources. When each resource managing process on the signaling route receives a signaling message, as with the previous exemplary embodiment, it maintains the active resources and selects backup resources. Resource managing process 201-5 selects a route including trans-mission channels 300-3, 300-1, 300-8 as a backup resource for the requesting task and also selects 400-1 as a backup resource for data processing.

In the previous exemplary embodiment, resource managing process 201-5 selects a route made up of transmission channels 300-9, 300-10. In the present exemplary embodiment, it cannot select this route because the processing capacity of data processor 400-4 available on the route is not sufficient to be used simultaneously by task 3-2 currently in use and by new signaling source task 3-3. A route that is available is a route using the same data processor as active data processor 400-5 and extending to node 101-7, using the uplink transmission channel of 300-5, the downlink transmission channel of 300-9, and the uplink transmission channel of 300-10 as backup transmission channels. This route will be referred to as route K. Another route using transmission channels 300-3, 300-1, 300-8 and data processor 400-1 is also possible, and will be referred to as route J. Cost increases of both of the routes are calculated according to equations (1) through (4). As a result, route J is found to incur a lower cost increase, and resources that make up route J are selected as backup resources. After signaling is performed on the backup resources selected by the resource managing processes, the lists of resource states and tasks which reflect the results of the signaling according to the link-state routing protocol are updated in resource managing process 201-5 as shown in FIGS. 16 and 17, and updated in resource managing process 201-6 as shown in FIGS. 18 and 19.

According to the above exemplary embodiment, as described above, backup resources are selected not by task managing processes at source and destination nodes of a communication path as a task, but independently by a plurality of resource managing processes which correspond to events that change the states of the resources used by the task. Thus, the signaling traffic and the processing load are reduced, and temporal and spatial load concentrations are avoided. It is made easy to introduce a task recovery guarantee into a large-scale network by localizing resource selection and recovery processing.

The present invention has been described above in reference to the exemplary embodiments. However, the present invention is not limited to the above exemplary embodiments. Rather, various changes that can be understood by those skilled in the art within the scope of the invention may be made to the arrangements and details of the present invention.

For example, the above exemplary embodiments can easily be applied to a situation where bands requested before and after data processing are different from each other. The situation corresponds to an instance of changing the data rate before and after data processing such as data compression. The source node and the destination node in the above exemplary embodiments may be the same as each other. The application corresponds to client-server communications where the source node and the destination node which are the same as each other serve as a client and the data processor as a server. The present invention as applied to the application makes it possible to achieve, at a low cost, the addition of a fault resistance capability covering communication routes to a throughput guarantee task which the client requests the server to provide.

Furthermore, the present invention is applicable to a situation where there are a plurality of source nodes or destination nodes. For example, a task for compression data according to a desired data processing process and multicasting the compressed data to a plurality of destination sources can be protected highly efficiently by the present invention.

The invention claimed is:

1. A distributed resource managing system comprising:
   a control unit comprising at least one central processing unit (CPU);
   a plurality of resource managing processes, executed by the control unit, corresponding to each of predefined events that change the states of resources, on a communication network where each of a plurality of tasks can use a plurality of resources, wherein each resource managing process of said plurality of resource managing processes comprises:
   an assignor which, when it receives a request to protect any specific task against the event that changes states of resources to which its own process corresponds, assigns backup resources including a resource already selected by another resource managing process to the task in such a way that all tasks requested to be protected which use the resource can be protected from said event that changes the states of resources; and
   an indicator which indicates information of the assigned backup resources to one or more recovery execution processes,
   wherein the recovery execution processes are located at positions at which a recovery can be performed in the event of a fault,
   wherein a resource managing process of the plurality of resource managing processes selects a backup resource for a signaled task based on a list of tasks to be recovered, and
   wherein based on the list of tasks and information about link band utilization and a reservation status of the network, the resource managing process calculates cost increases of routes that do not go through the resource managing process, and selects backup resources for a route which has a lowest cost increase as the backup resource for the task to be recovered.

2. The distributed resource managing system according to claim 1, wherein said indicator determines a recovery execution process for a combination of the corresponding event that changes the states of resources and the task, and indicates information of the backup resource which the task is to use when the event that changes the states of resources occurs, to said one or more recovery execution processes.

3. The distributed resource managing system according to claim 1, wherein said one or more recovery execution processes activate a recovery process for the task upon detection of a state change of the task to which the information of the corresponding backup resource is indicated or the occurrence of the event that changes the states of resources to which the resource managing process as an indication source corresponds.

4. The distributed resource managing system according to claim 1, wherein when each resource managing process of said plurality of resource managing processes receives a release request from another process, if all backup bands that are reserved are reduced as a result of released resources, then each resource managing process of said plurality of resource managing processes advertises resources to be reduced as resources to be released, and actually releases the resources after a certain time.

5. The distributed resource managing system according to claim 4, wherein signaling for reserving said backup resource is completed at a desired timing within a certain time after the backup resource is determined.

6. The distributed resource managing system according to claim 1, further comprising:
an information sharer which shares state information of a resource that can be selected as said backup resource among different resource managing processes;
wherein when said each resource managing process of said plurality of resource managing processes receives an indication of the updating of the states of the resources, said each resource managing process of said plurality of resource managing processes optimizes backup resource selection using only the data held by its own process.

7. The distributed resource managing system according to claim 1, wherein when said each resource managing process of said plurality of resource managing processes receives a task activation signaling message, said each resource managing process of said plurality of resource managing processes determines the backup resource and performs reservation signaling, and transfers the result to a downstream resource managing process; and the downstream resource managing process which has received the result reflects received information of the backup resource in a resource state database and selects the backup resource.

8. The distributed resource managing system according to claim 1, wherein when said each resource managing process of said plurality of resource managing processes assigns the backup resource to the task requested to be protected, said each resource managing process of said plurality of resource managing processes preferentially assigns a resource already assigned by another resource managing process as a backup resource for the same task.

9. The distributed resource managing system according to claim 1, wherein the assigned backup resource is not reserved for some of the tasks requested to be protected before a recovery process according to said one or more recovery execution processes is activated.

10. A distributed resource managing method using a plurality of resource managing processes corresponding to each of predefined events that change the states of resources, on a communication network where each of a plurality of tasks can use a plurality of resources, wherein each resource managing process of said plurality of resource managing processes comprises:
when it receives a request to protect any specific task against the event that changes states of resources to which its own process corresponds, assigning backup resources including a resource already selected by another resource managing process to the task in such a way that all tasks requested to be protected which use the resource can be protected from said resource states changing event; and
indicating information of the assigned backup resources to one or more recovery execution processes,
wherein the recovery execution processes are located at positions at which a recovery can be performed in the event of a fault,
wherein a resource managing process of the plurality of resource managing processes selects a backup resource for a signaled task based on a list of tasks to be recovered, and
wherein based on the list of tasks and information about link band utilization and a reservation status of the network, the resource managing process calculates cost increases of routes that do not go through the resource managing process, and selects backup resources for a route which has a lowest cost increase as the backup resource for the task to be recovered.

* * * * *

UNITED STATES PATENT AND TRADEMARK OFFICE
CERTIFICATE OF CORRECTION

PATENT NO. : 8,650,432 B2  
APPLICATION NO. : 12/934040  
DATED : February 11, 2014  
INVENTOR(S) : Tsuneo Nakata Page 1 of 1

It is certified that error appears in the above-identified patent and that said Letters Patent is hereby corrected as shown below:

On the Title Page:

(*) Notice: Subject to any disclaimer, the term of this patent is extended or adjusted under 35 U.S.C. 154(b) by 233 days. This patent is subject to a terminal disclaimer.

should appear as follows:

(*) Notice: Subject to any disclaimer, the term of this patent is extended or adjusted under 35 U.S.C. 154(b) by 233 days.

Signed and Sealed this
Nineteenth Day of August, 2014

Michelle K. Lee
*Deputy Director of the United States Patent and Trademark Office*